(12) United States Patent
Quach et al.

(10) Patent No.: US 11,098,595 B2
(45) Date of Patent: Aug. 24, 2021

(54) AIRFOIL FOR GAS TURBINE ENGINE

(71) Applicant: United Technologies Corporation, Farmington, CT (US)

(72) Inventors: San Quach, Southington, CT (US); Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 679 days.

(21) Appl. No.: 15/584,846

(22) Filed: May 2, 2017

(65) Prior Publication Data

US 2018/0320529 A1 Nov. 8, 2018

(51) Int. Cl.
| | | |
|---|---|---|
| *F01D 5/18* | (2006.01) | |
| *B22C 9/10* | (2006.01) | |
| *B22F 10/10* | (2021.01) | |
| *B33Y 80/00* | (2015.01) | |
| *F01D 25/12* | (2006.01) | |
| *B33Y 10/00* | (2015.01) | |

(52) U.S. Cl.
CPC ............ *F01D 5/186* (2013.01); *B22C 9/10* (2013.01); *B22F 10/10* (2021.01); *B33Y 80/00* (2014.12); *F01D 5/187* (2013.01); *F01D 25/12* (2013.01); *B33Y 10/00* (2014.12); *F05D 2230/21* (2013.01); *F05D 2230/211* (2013.01); *F05D 2240/11* (2013.01); *F05D 2240/12* (2013.01); *F05D 2240/30* (2013.01); *F05D 2240/35* (2013.01); *F05D 2250/75* (2013.01); *F05D 2260/202* (2013.01)

(58) Field of Classification Search
CPC .......... F01D 5/186; F01D 5/187; F01D 25/12; B22C 9/10; B22F 3/008; B22F 10/10; B33Y 10/00; B22Y 80/00; F05D 2220/32; F05D 2230/21; F05D 2230/211; F05D 2240/11; F05D 2240/12; F05D 2240/30; F05D 2240/35; F05D 2250/75; F05D 2260/202
See application file for complete search history.

(56) References Cited

U.S. PATENT DOCUMENTS

| 6,530,416 B1 | 3/2003 | Tiemann | |
|---|---|---|---|
| 8,322,987 B2 * | 12/2012 | Webster | F01D 5/187 |
| | | | 416/96 R |

(Continued)

FOREIGN PATENT DOCUMENTS

| EP | 1953343 | 8/2008 |
|---|---|---|
| EP | 1972396 | 9/2008 |
| EP | 3108981 | 12/2016 |

OTHER PUBLICATIONS

Extended EP Search Report for EP Application No. 18170402.4 dated Aug. 7, 2018.

*Primary Examiner* — Bryan M Lettman
(74) *Attorney, Agent, or Firm* — Carlson, Gaskey & Olds, P.C.

(57) ABSTRACT

An airfoil includes a leading edge and a trailing edge. A first exterior wall extends between the leading edge and the trailing edge. A second exterior wall opposite the first exterior wall extends between the leading edge and the trailing edge. A first cavity is adjacent the first exterior wall and includes a central portion and at least one forward extending slot passage and at least one aft extending slot passage.

12 Claims, 5 Drawing Sheets

(56) References Cited

U.S. PATENT DOCUMENTS

| | | |
|---|---|---|
| 9,017,025 B2 | 4/2015 | Lee |
| 2001/0016162 A1 | 8/2001 | Lutum |
| 2008/0240919 A1* | 10/2008 | Liang .................... F01D 5/186 |
| | | 416/91 |
| 2011/0236221 A1 | 9/2011 | Campbell |
| 2013/0205793 A1 | 8/2013 | Xu |
| 2014/0033736 A1 | 2/2014 | Propheter-Hinckley |
| 2014/0199177 A1 | 7/2014 | Propheter-Hinckley |
| 2014/0205454 A1 | 7/2014 | Giovannetti et al. |
| 2015/0016944 A1* | 1/2015 | Vandervaart ............ B22C 9/103 |
| | | 415/1 |
| 2016/0003056 A1* | 1/2016 | Xu ............................ B22C 9/10 |
| | | 416/97 R |
| 2016/0032732 A1* | 2/2016 | Propheter-Hinckley ..................... |
| | | F01D 5/187 |
| | | 416/95 |
| 2016/0319674 A1* | 11/2016 | Gleiner .................... B22C 9/06 |
| 2016/0333701 A1* | 11/2016 | Lewis ..................... F01D 5/187 |
| 2016/0376989 A1 | 12/2016 | Quach et al. |
| 2017/0183969 A1 | 6/2017 | Dujol et al. |
| 2018/0073373 A1* | 3/2018 | Paquin ..................... B22C 9/04 |

* cited by examiner

AIRFOIL FOR GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Turbine engine components, such as turbine blades and vanes, are operated in high temperature environments. To avoid deterioration in the components resulting from their exposure to high temperatures, it is necessary to provide cooling circuits within the components. Turbine blades and vanes are subjected to high thermal loads on both the suction and pressure sides of their airfoil portions and at both the leading and trailing edges. The regions of the airfoils having the highest thermal load can differ depending on engine design and specific operating conditions.

SUMMARY

In one exemplary embodiment, an airfoil includes a leading edge and a trailing edge. A first exterior wall extends between the leading edge and the trailing edge. A second exterior wall opposite the first exterior wall extends between the leading edge and the trailing edge. A first cavity is adjacent the first exterior wall and includes a central portion and at least one forward extending slot passage and at least one aft extending slot passage.

In a further embodiment of any of the above, at least one forward extending slot passage is in communication with at least one forward cooling slot.

In a further embodiment of any of the above, at least one aft extending slot passage is in communication with at least one aft cooling slot.

In a further embodiment of any of the above, a leading edge feed cavity is spaced from the first exterior wall by the at least one forward extending slot passage.

In a further embodiment of any of the above, a trailing edge cavity is spaced from the first exterior wall by the at least one aft extending slot passage.

In a further embodiment of any of the above, at least one forward extending slot passage is in communication with at least one forward cooling slot. At least one aft extending slot passage is in communication with at least one aft cooling slot.

In a further embodiment of any of the above, a second cavity is adjacent the second exterior wall and includes a second central portion.

In a further embodiment of any of the above, the second cavity includes at least one aft extending slot passage.

In a further embodiment of any of the above, a trailing edge cavity is spaced from the second exterior wall by at least one aft extending slot passage on the second cavity.

In a further embodiment of any of the above, the second cavity includes at least one forward extending slot passage that is in communication with at least one forward cooling slot.

In a further embodiment of any of the above, a leading edge feed cavity is spaced from the second exterior wall by at least one forward extending slot passage on the second cavity.

In a further embodiment of any of the above, the leading edge feed cavity is spaced from the first exterior wall by at least one forward extending slot passage on the first cavity.

In a further embodiment of any of the above, the first cavity includes a ridge that separates at least one forward extending slot passage from at least one aft extending slot passage.

In a further embodiment of any of the above, the ridge includes a forward sloped surface and has a first slope and an aft sloped surface has a second slope. The first slope is different than the second slope.

In another exemplary embodiment, a method of forming airfoil component for a gas turbine engine includes the steps of forming a core which includes a central portion that extends in a spanwise direction. At least one forward branch extends from the central portion. At least one aft branch extends from the central portion and casts the component using the core.

In a further embodiment of any of the above, the method includes locating a plurality of pedestal forming features, a plurality of trip strip forming features, and a plurality of flow guide forming features in at least one forward branch.

In a further embodiment of any of the above, the method includes locating a plurality of pedestal forming features, a plurality of trip strip forming features, and a plurality of flow guide forming features in at least one forward branch and the at least one aft branch.

In a further embodiment of any of the above, a trough is formed in the central portion between at least one forward branch and at least one aft branch.

In a further embodiment of any of the above, at least one forward branch includes a plurality of forward branches that extend from the central portion. At least one aft branch includes a plurality of aft branches that extend from the central portion.

In a further embodiment of any of the above, the component is formed with an additive manufacturing process.

DETAILED DESCRIPTION

Figure 1:
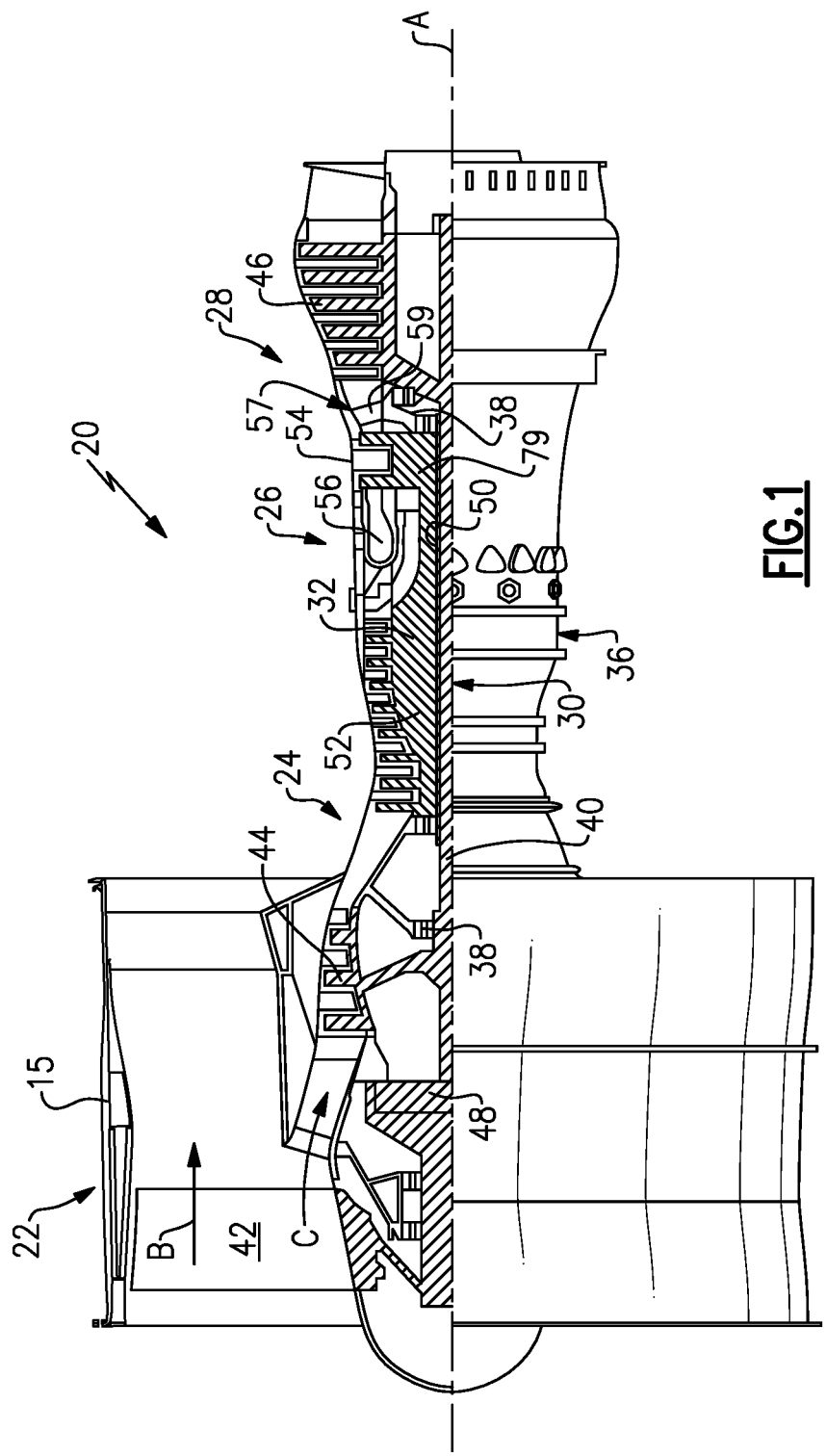
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
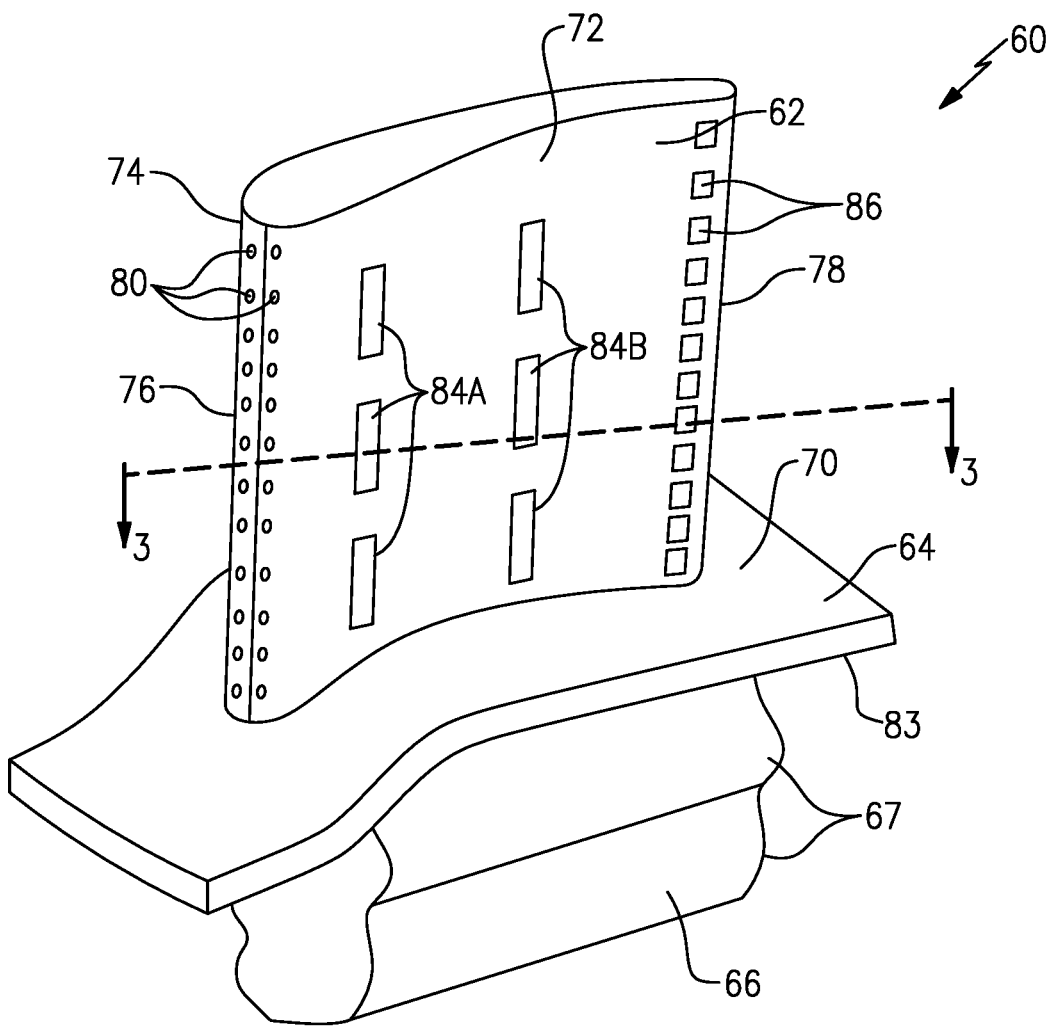
FIG. 2 shows an example gas turbine engine component.

FIG. 2 illustrates an example gas turbine engine component 60. In the illustrated example, the component 60 includes an airfoil 62, a platform 64, and optionally a root portion 66. In the illustrated example, the component 60 is a turbine blade. However, the component 60 could also be a vane, vane doublet, a compressor blade, a combustor liner, a blade outer air seal, or any structure with cooling features formed from ceramic cores or core of other material. The component 60 is configured to form a circumferential ring surrounding the engine axis A when jointed with additional similar components 60. In this disclosure, circumferential or circumferentially spaced is relative to a circumference surrounding the engine axis A of the gas turbine engine 20 unless otherwise specified.

The radially outer side 70 of the platform 64 forms a radially inner boundary for fluid traveling over the component 60. The root portion 66 extends radially inward from the platform 64 to retain the component 60 to a turbine rotor 79 (FIG. 1). The root portion 66 is located on an opposite side of the platform 64 from the airfoil 62 on a radially inner side 83. The root portion 66 includes teeth 67 located on opposite sides of the root portion 66 for engaging complimentary shaped receptacles on the turbine rotor 79 of the gas turbine engine 20.

As shown in FIG. 2, the airfoil 62 includes a pressure side 72 forming an exterior wall and a suction side 74 forming another exterior wall opposite the pressure side 72. Leading edge cooling holes 80 are spaced radially along a leading edge 76 of the airfoil 62 on both the pressure side 72 and the suction side 74. Although the leading edge cooling holes 80 in the illustrated example are circular, other shapes such as elliptical holes, oval holes, oblong holes, and race-track shaped holes could be used.

A first plurality of cooling slots 84A and a second plurality of cooling slots 84B are spaced radially along the pressure side 72 of the airfoil 62. In the illustrated example, the first plurality of cooling slots 84A is axially aligned and extends in a radial direction and the second plurality of cooling slots 84B is axially aligned and extends in a radial direction. The first plurality of cooling slots 84A are also axially spaced from the second plurality of cooling slots 84B.

A plurality of trailing edge cooling holes 86 are spaced radially along the pressure side 72 of the airfoil 62 immediately upstream of a trailing edge 78.

Figure 3:
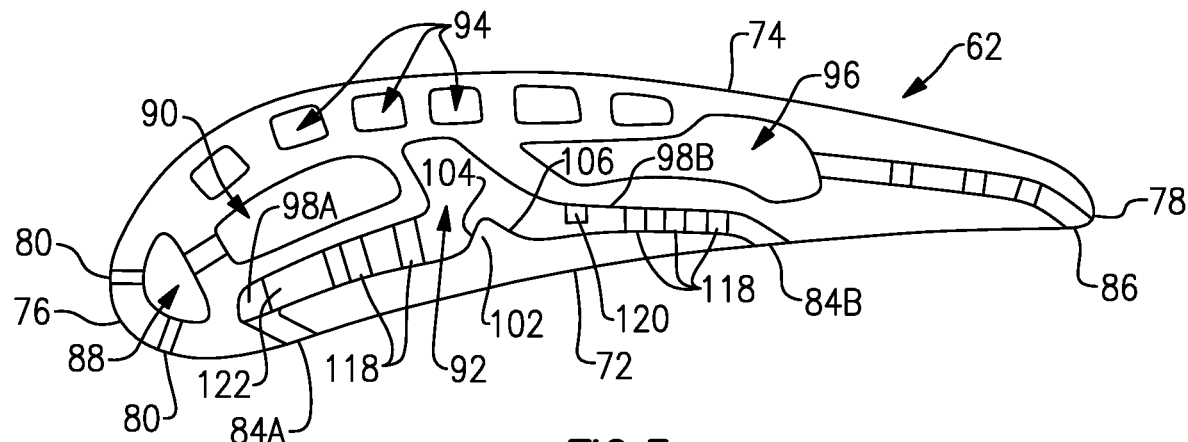
FIG. 3 is a cross-sectional view taken along line 3-3 of FIG. 2.

As shown in FIG. 3, the airfoil 62 includes internal cooling passages, such as an impingement cavity 88, a feed cavity 90, a pressure side cavity 92, a plurality of suction side cavities 94, and a trailing edge cavity 96. In the illustrated example, the pressure side cavity 92 feeds cooling air to the first plurality of cooling slots 84A and the second plurality of cooling slots 84B to create a cooling film over the pressure side 72 as the cooling air travels out of the first and second plurality of cooling slots 84A, 84B and towards the trailing edge 78. The impingement cavity 88, the feed cavity 90, the pressure side cavity 92, the plurality of suction side cavities 94, and the trailing edge cavity 96 in the airfoil 62 can be formed through an investment casting process using ceramic cores that correspond to each of the impingement cavity 88, the feed cavity 90, the pressure side cavity 92, the plurality of suction side cavities 94, and the trailing edge cavity 96.

Each of the first plurality of cooling slots 84A are each fed by a corresponding one of the first slot passages 98A and each of the second plurality of cooling slots 84B are each fed by a corresponding one of the second slot passages 98B. The first and second slot passages 98A, 98B form at least a portion of an internal cooling circuit (a network of cooling passages) for cooling the airfoil 62.

The first slot passages 98A extend from a central portion of the pressure side cavity 92 upstream or forward towards the leading edge 76. The first slot passages 98A provide additional cooling protection for the feed cavity 90 and/or the impingement cavity 88 by shielding the feed cavity 90 and the impingement cavity 88 from the elevated temperatures along the pressure side 72 of the airfoil 62.

By shielding the feed cavity 90 and/or the impingement cavity 88, a temperature of the cooling air exiting the leading edge cooling holes 80 along the leading edge 76 is reduced and improves cooling along the leading edge 76 of the airfoil 62. By reducing the temperature of the cooling air exiting the leading edge cooling holes 80, the amount of cooling air supplied to the leading edge cooling holes 80 can be reduced or the temperatures the airfoil 62 is subjected to can increase. When the amount of cooling for the airfoil 62 is reduced, the efficiency of the gas turbine engine 20 can increase because less air is bled off of the gas turbine engine 20 which increases the amount of compressed air that will contribute to combustion and thrust production.

The second slot passages 98B extend from the central portion of the pressure side cavity 92 downstream or aft towards the trailing edge 78. The first and second slot passages 98A, 98B form a T-shape with the central portion of the pressure side cavity 92. The second slot passages 98B provide additional cooling protection for the trailing edge cavity 96 by shielding the trailing edge cavity 96 from the elevated temperatures along the pressure side 72 of the airfoil 62.

By shielding the trailing edge cavity 96, a temperature of the cooling air exiting the trailing edge cooling holes 86 along the trailing edge 78 is reduced to provide better cooling along the trailing edge 78 of the airfoil 62. By reducing the temperature of the cooling air exiting the trialing edge cooling holes 86, the amount of cooling air supplied to the trailing edge feed cavity 96 and the trialing edge cooling holes 86 can be reduced or the temperature the airfoil 62 is subjected to can increase. When the amount of cooling for the airfoil 62 is reduced, the efficiency of the gas turbine engine 20 can increase because less air is bled off of the gas turbine engine 20 which increases the amount of compressed air that will contribute to combustion and thrust production.

Figure 4:
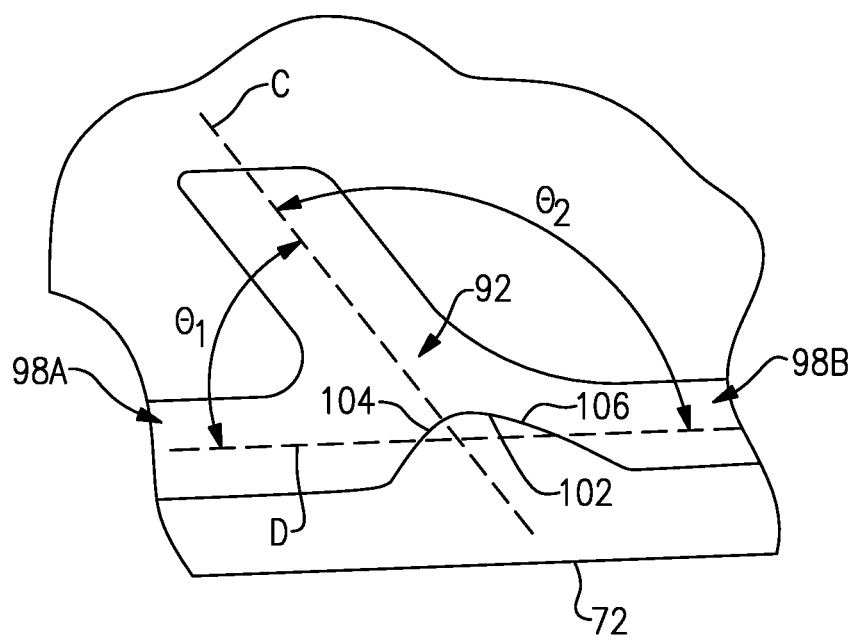
FIG. 4 is an enlarged view of a portion of FIG. 3.

FIG. 4 illustrates an enlarged view of the central portion of the pressure side cavity 92. In the illustrated non-limiting embodiment, the central portion of the pressure side cavity 92 extends along a line C and inlet portions of the first and second slot passages 98A, 98B extending along a line D. In the illustrated embodiment, the line C extends through a center of the central portion of the pressure side cavity 92 in a longitudinal direction of the cavity and the line D extends through a center of the inlet portions of the first and second slot passages 98A, 98B in a longitudinal direction of the passages. Line D through the first slot passage 98A is angled at an angle $\theta_1$ relative to the line C through the central portion of the pressure side cavity 92 and line D through the second slot passage 98B is at an angle $\theta_2$ relative to the line C. In the illustrated embodiment, the angle $\theta_2$ is greater than the angle $\theta_1$. In another example embodiment, the angle $\theta_2$ is less than or equal to the angle $\theta_1$. In yet another embodiment, the angle $\theta_2$ is equal to the angle $\theta_1$.

The central portion of the pressure side cavity 92 also includes a ridge 102 that extends in a spanwise direction through the cavity and at least partially separates the first slot passage 98A from the second slot passage 98B. The ridge 120 is at least partially aligned with the intersection of line C and line D. The ridge 102 includes a first slanted surface 104 and a second slanted surface 106. In the illustrated non-limiting embodiment, the first slanted surface 104 includes a slope that is greater than a slope of the second slanted surface 106. The slopes of the first and second slanted surfaces 104, 106 contributes to directing cooling air into the first and second slot passages 98A, 98B. In one non-limiting embodiment, when the angle $\theta_1$ is less than the angle $\theta_2$, the first slanted surface 104 has a greater slope than the second slanted surface 106. In another non-limiting embodiment, when the angle $\theta_1$ is greater than the angle $\theta_2$, the second slanted surface 106 has a greater slope than the first slanted surface 104.

Figure 5:
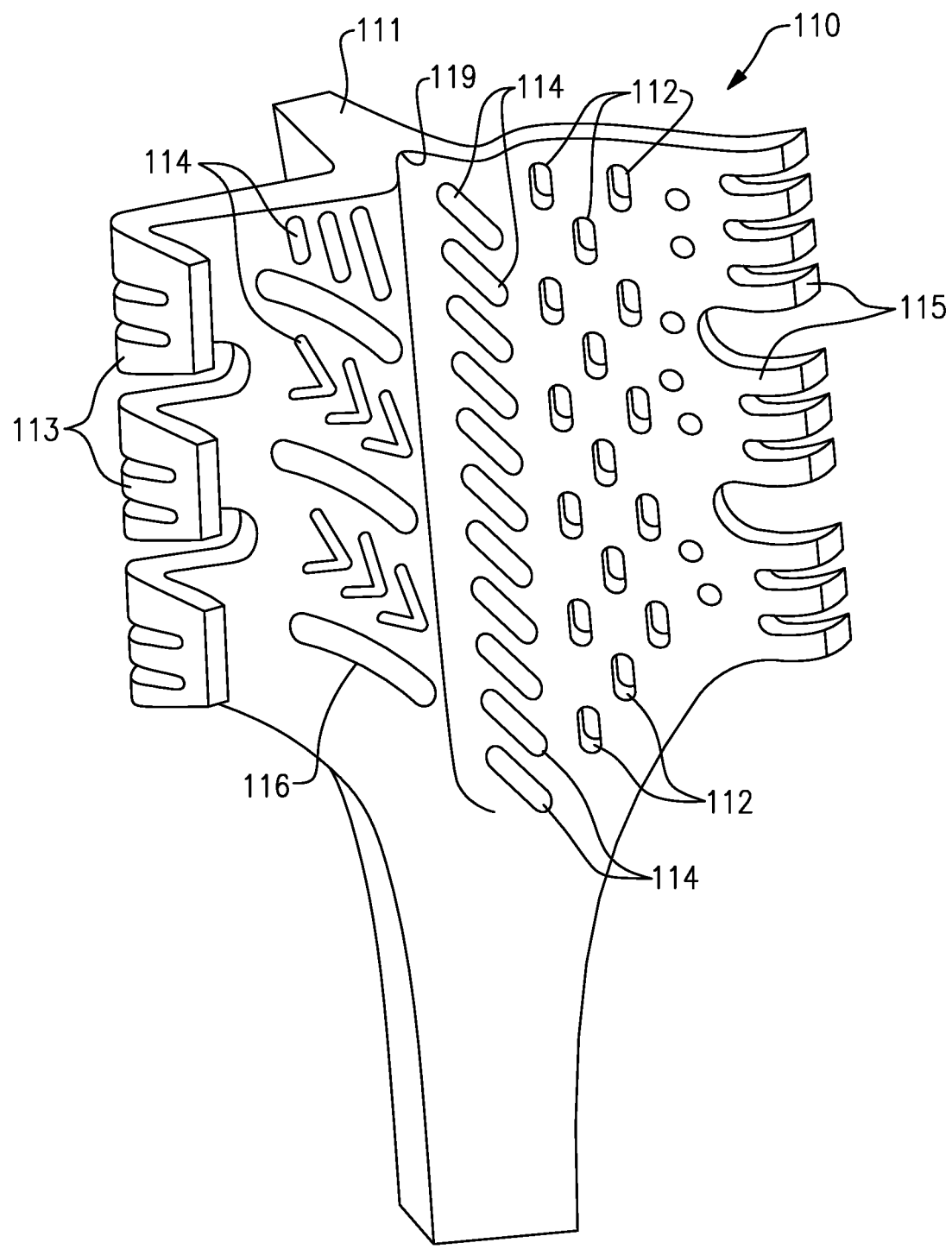
FIG. 5 is perspective view of an example ceramic core.

FIG. 5 illustrates an example ceramic core 110 for forming the pressure side cavity 92 that travels in a generally spanwise direction (e.g., radially through a central portion of the component 60). The ceramic core 110 includes a central portion 111 that extends in a spanwise direction that corresponds to the central portion of the pressure side cavity 92, a plurality of forward branches 113 that correspond to the first slot passages 98A, and a plurality of aft branches 115 that correspond to the second slot passages 98B. A trough 119 extends into the central portion 111 of the ceramic core to form the corresponding ridge 102.

The forward branches 113 and the aft branches 115 include pedestal forming features 112, trip strip forming features 114, and flow guide forming features 116. Once the ceramic core 110 is cast to form an airfoil, the pedestal forming features 112 will correspond to pedestals 118 (FIG. 3) in the pressure side cavity 92. The pedestal forming features 112 can be circular, oblong, racetrack-shaped, teardrop-shaped or any other shape depending on the flow control needs of the cooling circuit.

Similarly, the trip strip forming features 114 will correspond to trip strips 120 (FIG. 3) in the pressure side cavity 92 and the flow guide forming features 116 will correspond to flow guides 122 (FIG. 3) in the pressure side cavity 92. The trip strip forming features 114 and the flow guide forming features 116 can be positioned in various locations depending on the flow control needs of the pressure side cavity.

Figure 6:
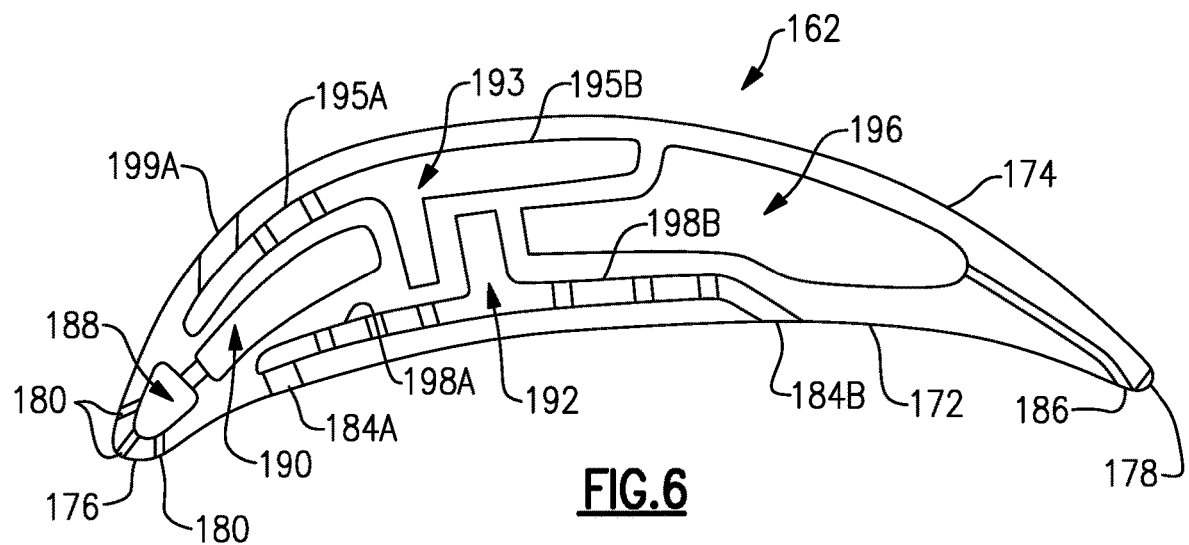
FIG. 6 is a cross-sectional view of another example gas turbine engine component.

FIG. 6 illustrates a cross-sectional view of an airfoil 162. The airfoil 162 is similar to the airfoil 62 except where described below or shown in the Figures. The airfoil 162 includes a leading edge 176, a trailing edge 178, a pressure side 172, and a suction side 174. The airfoil 162 also includes internal cooling passages, such as an impingement cavity 188, a feed cavity 190, a pressure side cavity 192, a suction side cavity 193, and a trailing edge cavity 196.

In the illustrated example, the pressure side cavity 192 includes a central portion with first slot passages 198A extending forward or upstream and second slot passages 198B extending aft or downstream. The pressure side cavity 192 feeds cooling air to a first plurality of cooling slots 184A and a second plurality of cooling slots 184B to create a cooling film over the pressure side 172 as the cooling air travels out of the plurality of cooling slots 184A, 184B and towards the trailing edge 178. The first plurality of cooling slots 184A are each fed by a corresponding one of the first slot passages 198A and the second plurality of cooling slots 184B are each fed by a corresponding one of the second slot passages 198B. Moreover, the suction side cavity 193 can be formed from a ceramic core 110 similar to the ceramic core 110 but configured to be located adjacent a suction side 174 of the airfoil 162.

The suction side cavity 193 includes a T-shaped configuration similar to the T-shaped configuration of the pressure side cavity 192 with first slot passages 195A and second slot passages 195B extending from a central portion of the suction side cavity 193. A plurality of cooling slots 199A are fed by a corresponding one of the first slot passages 195A and create a cooling film over the suction side 174 of the airfoil 162. The first slot passages 195A provide additional heat shielding for the feed cavity 190 and/or the impingement cavity 188 from the elevated temperatures along the suction side 174 and the second slot passages 195B provide additional heat shielding for the trailing edge cavity 196 along the suction side 174.

Figure 7:
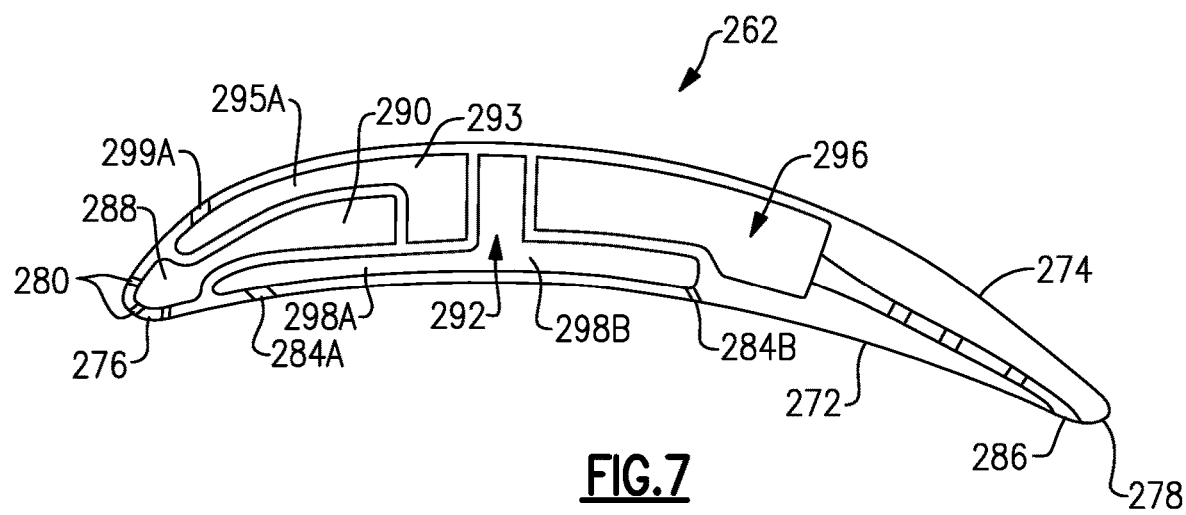
FIG. 7 is a cross-sectional view of yet another example gas turbine engine component.

FIG. 7 illustrates a cross-sectional view of an airfoil 262. The airfoil 262 is similar to the airfoil 62 except where described below or shown in the Figures. The airfoil 262 includes a leading edge 276, a trailing edge 278, a pressure side 272, and a suction side 274. The airfoil 262 also includes internal cooling passages, such as an impingement cavity 288, a feed cavity 290, a pressure side cavity 292, a suction side cavity 293, and a trailing edge cavity 296.

In the illustrated example, the pressure side cavity 292 includes a central portion with first slot passages 298A extending forward or upstream and second slot passages 298B extending aft or downstream. The pressure side cavity 292 feeds cooling air to a first plurality of cooling slots 284A and a second plurality of cooling slots 284B to create a cooling film over the pressure side 272 as the cooling air travels out of the plurality of cooling slots 284A, 284B and towards the trailing edge 278. The first plurality of cooling slots 284A are each fed by a corresponding one of the first slot passages 298A and the second plurality of cooling slots 284B are each fed by second slot passages 298B as described above.

The suction side cavity 293 includes an L-shaped configuration with a plurality of first slot passage 295A extending upstream or forward towards the leading edge 276 to feed a corresponding one of the plurality of cooling slots 299A to create a cooling film over the suction side 274 of the airfoil 262. The first slot passages 295A provide additional heat shielding for the feed cavity 290 and/or the impingement cavity 288 from the elevated temperatures along the suction side 274.

The present disclosure also applies to additive manufacturing techniques to form the component 60. In general terms, additive manufacturing techniques allow for the creation of a component by building the component with successively added layers; e.g., layers of powdered material. The additive manufacturing process facilitates manufacture of relatively complex components, minimize assembly details and minimize multi-component construction. In the additive manufacturing process, one or more materials are deposited on a surface in a layer.

In some instances, the layers are subsequently compacted. The material(s) of the layer may be subsequently unified using any one of a number of known processes (e.g., laser, electron beam, etc.). Typically, the deposition of the material (i.e. the geometry of the deposition later for each of the materials) is computer controlled using a three-dimensional computer aided design (CAD) model. The three-dimensional (3D) model is converted into a plurality of slices, with each slice defining a cross section of the component for a predetermined height (i.e. layer) of the 3D model. The additively manufactured component is then "grown" layer by layer; e.g., a layer of powdered material(s) is deposited and then unified, and then the process is repeated for the next layer.

Examples of additive manufacturing processes that can be used with the present disclosure include, but are not limited to, Stereolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Direct Metal Laser Sintering (DMLS) and others. The present disclosure is not limited to using any particular type of additive manufacturing process.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. An airfoil comprising:
a leading edge and a trailing edge;

a first exterior wall extending between the leading edge and the trailing edge;

a second exterior wall opposite the first exterior wall extending between the leading edge and the trailing edge; and a first feed cavity adjacent the first exterior wall including a central portion extending radially through the airfoil and at least one forward extending slot passage extending from the central portion and at least one aft extending slot passage extending from the central portion, wherein the at least one forward extending slot passage is in communication with at least one forward cooling slot, and wherein the first feed cavity includes a ridge separating the at least one forward extending slot passage from the at least one aft extending slot passage.

2. The airfoil of claim 1, wherein the at least one aft extending slot passage is in communication with at least one aft cooling slot.

3. The airfoil of claim 1, further comprising a leading edge feed cavity spaced from the first exterior wall by the at least one forward extending slot passage and the leading edge feed cavity is fluidly separated from the first feed cavity.

4. The airfoil of claim 3, further comprising a trailing edge feed cavity spaced from the first exterior wall by the at least one aft extending slot passage and the trailing edge feed cavity is in fluid communication with a plurality of trailing edge cooling holes.

5. The airfoil of claim 4, wherein the at least one forward extending slot passage is in communication with at least one forward cooling slot and the at least one aft extending slot passage is in communication with at least one aft cooling slot.

6. The airfoil of claim 1, further comprising an impingement cavity adjacent a leading edge of the airfoil and fluidly separated from the at least one forward extending slot passage and an inlet to the first feed cavity is downstream of the at least one forward extending slot passage and upstream of the at least one aft extending slot passage.

7. The airfoil of claim 1, wherein the ridge includes a forward sloped surface have a first slope and an aft sloped surface having a second slope and the first slope is different than the second slope.

8. An airfoil comprising:

a leading edge and a trailing edge;

a first exterior wall extending between the leading edge and the trailing edge;

a second exterior wall opposite the first exterior wall extending between the leading edge and the trailing edge; and a first feed cavity adjacent the first exterior wall including a central portion and at least one forward extending slot passage and at least one aft extending slot passage, wherein the first feed cavity includes a ridge separating the at least one forward extending slot passage from the at least one aft extending slot passage and the ridge is configured to direct the air forward to the at least one forward extending slot passage and aft to the at least one aft extending slot passage.

9. The airfoil of claim 8, wherein the ridge includes a forward sloped surface have a first slope and an aft sloped surface having a second slope and the first slope is different than the second slope.

10. The airfoil of claim 8, further comprising a second feed cavity in fluid communication with an impingement cavity, wherein the impingement cavity is in fluid communication with a plurality of leading edge cooling holes.

11. The airfoil of claim 10, wherein the impingement cavity if fluidly separated from the first feed cavity and the at least one forward extending slot passage by a portion of the first exterior wall.

12. The airfoil of claim 8, further comprising a trailing edge feed cavity in fluid communication with at least one trailing edge cooling hole and an inlet to the first feed cavity is downstream and radially inward of the at least one forward extending slot passage and upstream and radially inward of the at least one aft extending slot passage.

* * * * *